(12) United States Patent
Emerson

(10) Patent No.: US 9,283,659 B2
(45) Date of Patent: Mar. 15, 2016

(54) STRAIGHT EDGE BAR CLAMP

(71) Applicant: Eugene Emerson, Whittier, CA (US)

(72) Inventor: Eugene Emerson, Whittier, CA (US)

( * ) Notice: Subject to any disclaimer, the term of this patent is extended or adjusted under 35 U.S.C. 154(b) by 85 days.

(21) Appl. No.: 14/256,783

(22) Filed: Apr. 18, 2014

(65) Prior Publication Data

US 2015/0298299 A1    Oct. 22, 2015

(51) Int. Cl.
*B25B 5/10* (2006.01)
*B43L 7/00* (2006.01)
*B23B 5/16* (2006.01)
*B43L 13/02* (2006.01)

(52) U.S. Cl.
CPC . *B25B 5/10* (2013.01); *B23B 5/166* (2013.01); *B43L 7/00* (2013.01); *B43L 13/02* (2013.01)

(58) Field of Classification Search
CPC .................................. B43L 7/00; B43L 13/02
USPC ............................. 33/430, 434, 436, 443, 485
See application file for complete search history.

(56) References Cited

U.S. PATENT DOCUMENTS

| | | | | |
|---|---|---|---|---|
| 4,490,920 A * | 1/1985 | Griset | ..................... | B23B 47/28 33/32.3 |
| 4,499,667 A * | 2/1985 | Griset | ................... | B23B 47/287 33/437 |
| 5,348,276 A * | 9/1994 | Blacker | ..................... | B25B 1/08 269/152 |
| 7,114,715 B1 * | 10/2006 | Kirk | ........................ | B25B 5/068 269/147 |
| 7,484,306 B2 * | 2/2009 | Emerson | ................ | B25B 1/2489 33/403 |
| 7,631,434 B1 * | 12/2009 | Carter, Jr. | .............. | G01C 15/06 33/286 |
| 8,230,611 B1 | 7/2012 | Emerson | | |
| 2005/0156368 A1 * | 7/2005 | Fuller | ..................... | B25B 5/068 269/170 |
| 2005/0217128 A1 * | 10/2005 | Ben-Gigi | ................. | B25H 7/00 33/485 |
| 2012/0047755 A1 * | 3/2012 | Emerson | ................ | B25B 1/2489 33/430 |
| 2012/0174421 A1 * | 7/2012 | Emerson | ............. | B23Q 9/0042 33/430 |
| 2015/0174738 A1 * | 6/2015 | Beauregard | ............. | B25B 1/103 269/148 |
| 2015/0298299 A1 * | 10/2015 | Emerson | ................... | B25B 5/10 33/430 |

* cited by examiner

*Primary Examiner* — Yaritza Guadalupe-McCall
(74) *Attorney, Agent, or Firm* — John K. Park; Park Law Firm

(57) ABSTRACT

A straight edge bar clamp comprises an elongated channeled bar, a threaded base, first and second movable jaw bodies, bosses or divots, a catching device, and a threaded shaft. The elongated channeled bar having an inner channel portion. The threaded base is installed fixedly in the elongated channeled bar. The first movable jaw body is installed movably and partially in the elongated channeled bar between the second movable jaw body and the end of the bar furthest from the threaded base. The bosses or divots are provided on an inner surface of the inner channel portion and configured to define the predetermined stopping positions of the first movable jaw body. The catching device is provided in the first movable jaw body. The second movable jaw body is installed partially in the elongated channeled base movably between the threaded base and the first movable jaw body along the elongated channeled bar.

16 Claims, 6 Drawing Sheets

STRAIGHT EDGE BAR CLAMP

BACKGROUND OF THE INVENTION

The present invention relates to a straight edge bar clamp. More particularly, this invention relates to a straight edge bar clamp, which improves the features of conventional bar clamp.

An extrusion cross-section for a straight edge clamping device was disclosed and taught in U.S. patent application Ser. No. 12/987,825 filed Jan. 10, 2011 (patented as U.S. Pat. No. 8,230,611) by the Applicant.

However, the present application contrives to solve the problems or disadvantages of the prior art.

Accordingly, a need for a straight edge bar clamp has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a straight edge bar clamp.

A straight edge bar clamp comprising:

a straight edge bar comprising an elongated channeled bar having an inner channel portion with a constant cross-section, wherein the straight edge bar comprises a first end and a second end;

a threaded base installed fixedly partially in the elongated channeled bar at the first end of the straight edge bar;

a first movable jaw body installed movably and partially in the channel of the elongated channeled bar at a plurality of predetermined positions toward the second end of the straight edge bar;

a plurality of bosses or divots provided on an inner surface of the inner channel portion and configured to define the plurality of predetermined positions;

a catching device provided in the first movable jaw body and configured to be engaged by or released from one or combination of the plurality of the bosses or divots;

a second movable jaw body installed partially in the elongated channeled bar movably between the threaded base and the first movable jaw body along the elongated channeled bar; and a threaded shaft disposed in parallel with the straight edge bar and configured to be supported through the threaded base and anchored rotate-ably at the second movable jaw body so as to move the second movable jaw body parallel to and along the straight edge bar, so as to exert a clamping force when engage with a work piece between the moveable jaws.

The straight edge bar may further comprise:

a flat top portion;

straight portions;

a flat bottom portion;

one or more capturing channels provided between the flat top portion and the flat bottom portion and configured inside the inner channeled portion of the straight edge bar to capture and prevent the threaded base, the first movable jaw body, and the second movable jaw body from being lifted out of the inner channeled portion; and a pair of overhanging portions, each of which being provided at an inner edge of the flat bottom portion and defining one wall of the corresponding capturing channel.

The catching device may comprise a pawl, which is configured to be stopped at a catching position so as to be stopped by one or more of the bosses or divots or to be lifted up from the catching position by a lifted distance larger than a predetermined magnitude so as to clear the boss or divot and allow the first movable jaw body to slide along the straight edge bar.

Each of bosses may protrude from the inner surface of the inner channel portion sufficiently to catch the pawl of the catching device, or each divot may be a hollow spot on the inner channel portion of sufficient depth to catch the pawl of the catching device.

The threaded base may comprise an outer portion and an inner portion. The outer portion extends below the flat bottom portion, and the inner portion is disposed to be fixed in the channeled portion of the channeled bar, surrounded by the flat top portion, the capturing channel(s), and the overhanging portion(s).

The threaded shaft may comprise a screw portion supported by a matching threaded screw hole provided through the threaded base.

The threaded shaft may further comprise a handle portion disposed at the end of the screw portion which farthest from the second jaw body.

Each of the first and second movable jaw bodies may comprise an outer portion and an inner portion. The outer portion extends below the flat bottom portion, and the inner portion is disposed slide-ably in the channeled portion of the channeled bar, surrounded by the flat top portion, capturing channel(s), and the overhanging portion(s).

The threaded shaft may be disposed partially inside, entirely inside, or entirely outside the straight edge bar.

The advantages of the present invention are: (1) the straight edge bar clamp according to the invention is simple in structure; and (2) the straight edge bar clamp improves the usefulness of a bar clamp.

Especially, as the straight edge bar clamp can perform two functions; 1) Functions as a straight edge clamp, because the jaw bodies are inside the bar, the outside straight edge of the bar can be used to guide a tool. Note, the prior art cannot be used as a straight edge, as the jaw bodies interrupt the contiguous straight edge of the bar, as they wrap around the outside of the bar. 2) Functions as a bar clamp, where the usability of the bar clamp is greatly improved, as in the present invention the bar can rest directly on a work bench, with easy stability, as the jaw bodies are inside the bar, rather than resting on the jaw bodies as the prior art must.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
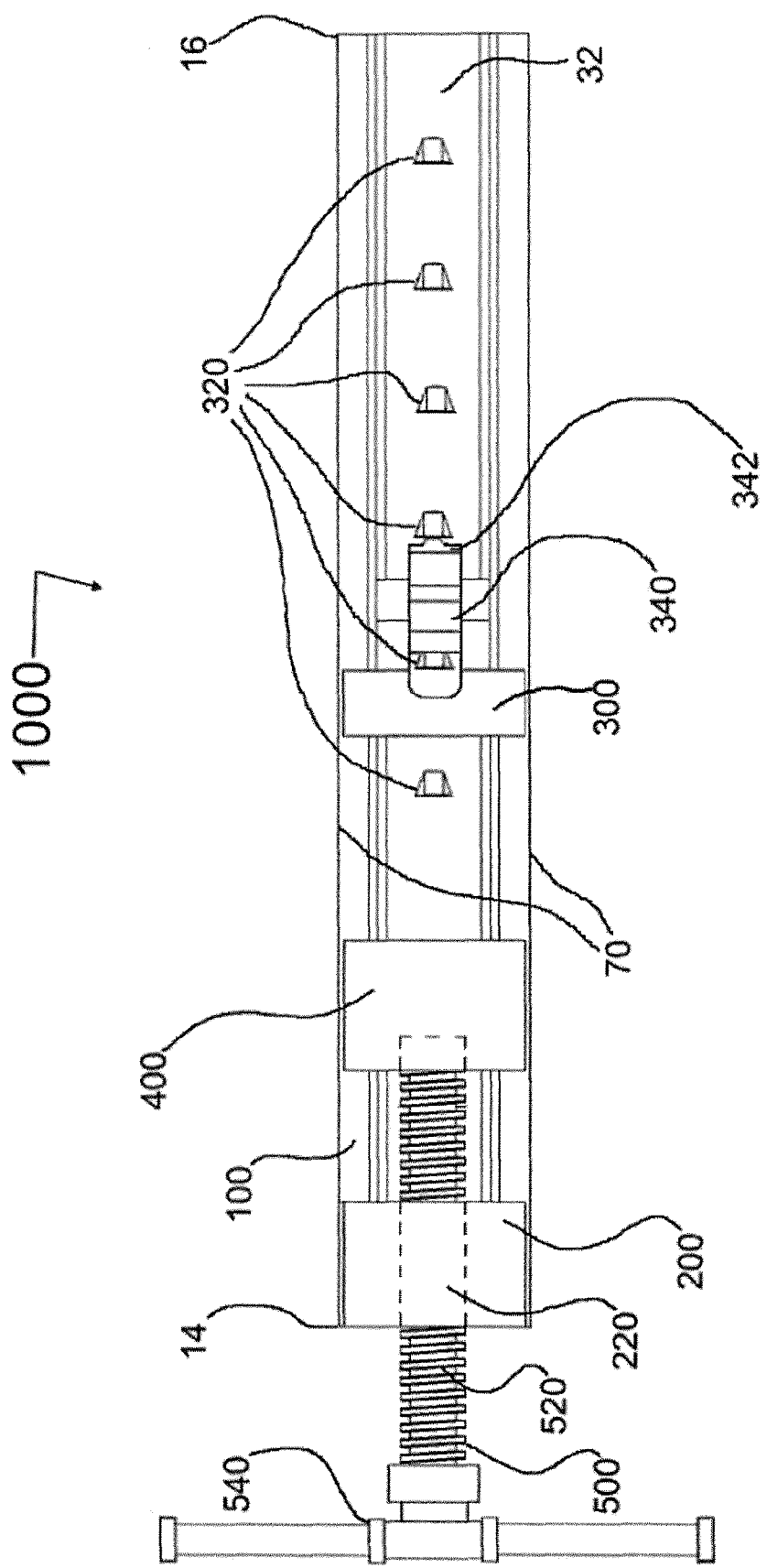
FIG. 1 is a top plan view showing a straight edge bar clamp according to the invention.

FIGS. 1-5 show straight edge bar clamps according to embodiments of the present invention.

A straight edge bar clamp 1000 comprises an elongated channeled bar 100, a threaded base 200, a first movable jaw body 300, a plurality of bosses or divots 320, a catching device 340, a catching pawl 342, a second movable jaw body 400, and a threaded shaft 500.

The straight edge bar 100 comprises an elongated channeled bar 100 having an inner channel portion 32 and a constant cross-section, and also the straight edge bar 100 comprises a first end 14 and a second end 16. The inner channel portion 32 also comprises two side channels and a pair of overhanging portions, each of which (the overhanging portion) being at an inner edge of the flat bottom portion and defining one wall of the adjacent side channel.

The threaded base 200 is installed fixedly partially in the elongated channeled bar 100 in the channel 32 at the first end 14 of the straight edge bar 100.

The first movable jaw body 300 is installed slide-ably partially in the channel 32 of the elongated channeled bar 100, surrounded by the flat top portion 30, the capturing channel(s) 50, and the overhanging portion(s) 60, at a plurality of pre-determined positions along the length of the bar from the second movable jaw to a point toward the second end 16 of the straight edge bar 100.

The plurality of bosses or divots 320 are provided on an inner surface of the inner channel portion 32 and configured to define the plurality of predetermined positions where the first movable jaw body 300 may stop.

The catching device 340 is provided in the first movable jaw body 300 and configured to be stopped when engaged, by one or more of the plurality of bosses or divots 320 and, to pass by when disengaged, so as to allow positioning to another one of the plurality of the bosses or divots 320.

The second movable jaw body 400 installed partially in the channeled portion of the elongated channeled bar 100, surrounded by the flat top portion, the capturing channel(s), and the overhanging portion(s), slide-ably between the threaded base 200 and the first movable jaw body 300 along the elongated channeled bar 100.

The threaded shaft 500 is disposed to be in parallel with the straight edge bar 100 and configured to be supported through the threaded base 200 and anchored rotate-ably in the second movable jaw body 400 so as to move the second movable jaw body 400 parallel to and along the straight edge bar 100, so as to position the second movable jaw, but also to exert a clamping force when engaged with a work piece 900 between the moveable jaws.

The straight edge bar 100 may further comprise a flat top portion 30, a straight edge portion(s) 70, a flat bottom portion 40, capturing channel(s) 50, and a pair of overhanging portions 60.

Figure 2:
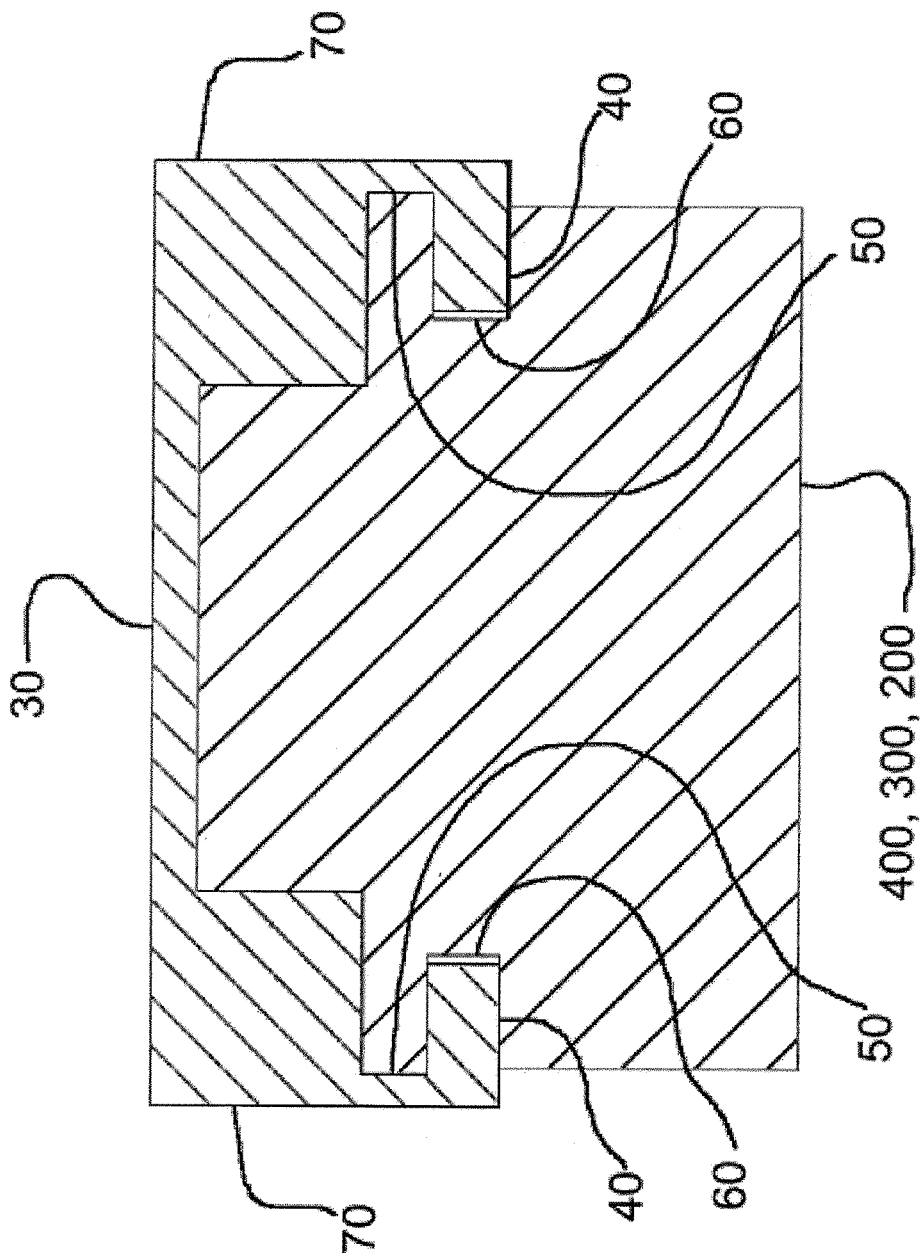
FIG. 2 is a cross-sectional view showing a straight edge bar clamp according to an embodiment of the invention.
Figure 3:
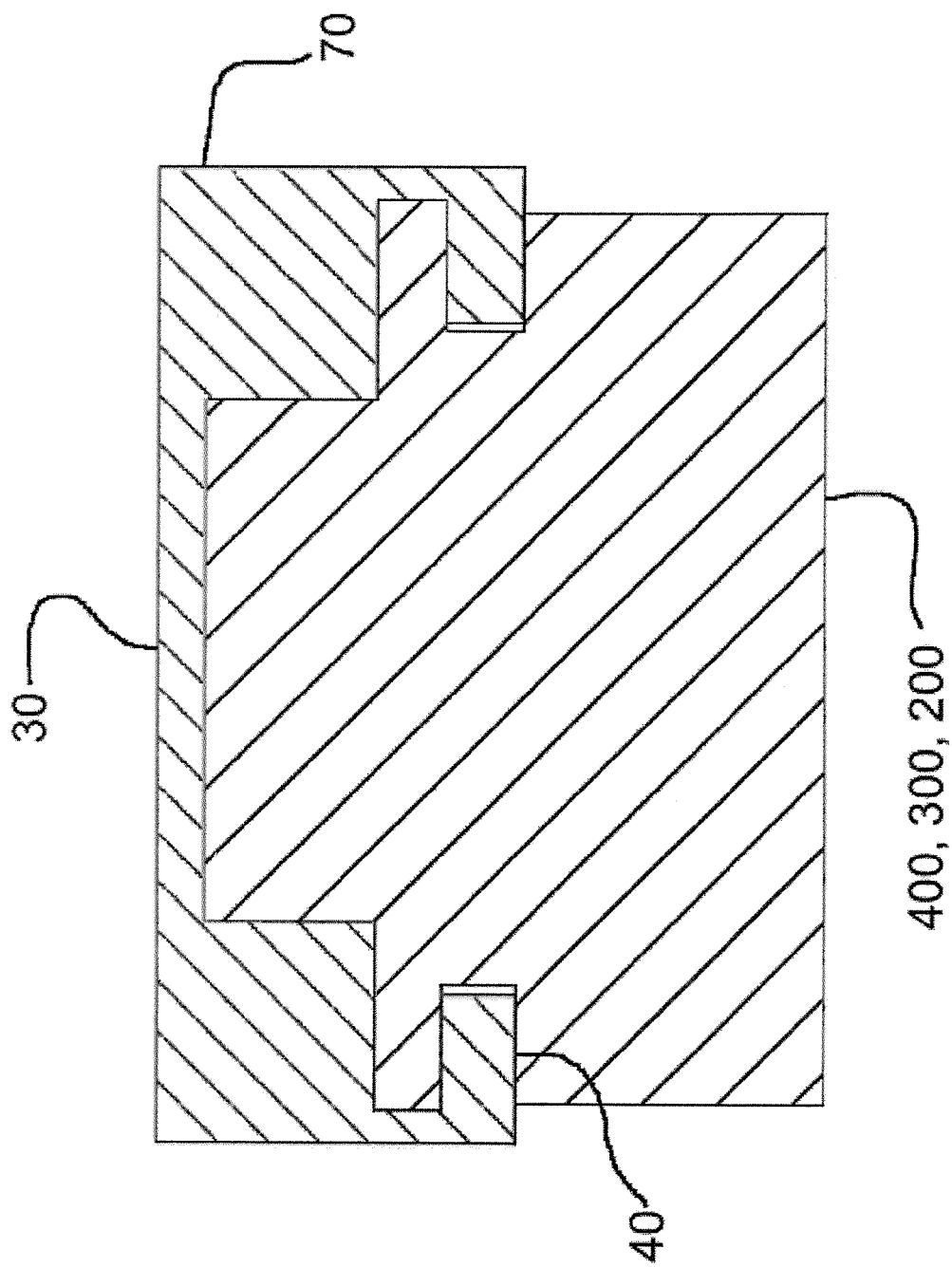
FIG. 3 is another cross-sectional view showing a straight edge bar clamp according to another embodiment of the invention.

The capturing channel(s) 50 are provided between the flat top portion 30 and the flat bottom portion 40, and inside the channel portion 32 disposed to be configured to capture and prevent the threaded base 200, the first movable jaw body 300, and the second movable jaw body 400 from coming out of the channel as shown in FIGS. 2 and 3.

Each of the overhanging portion(s) 60 is provided at an inner edge of the flat bottom portion 40 and defines the lower wall of the adjacent capturing channel 50.

The catching device 340 may comprise a pawl 342, which is configured to be stopped at a catching position so as to be stopped by one or more of the bosses or divots 320 or to be lifted up by a lifting distance larger than a predetermined magnitude so as to clear the boss or divot to allow the first movable jaw body 300 to slide along the straight edge bar 100.

Each boss or divot 320 may protrude from the inner surface of the inner channel portion 32, or each divot 320 may be a hollow spot on the inner channel portion 32, of the straight edge bar 100.

The threaded base 200 may comprise an outer portion and an inner portion. The outer portion extends below the flat bottom portion 40, and the inner portion is disposed, to be fixed, in the channel 32 surrounded by the flat top portion 30, the capturing channel(s) 50, and the overhanging portion(s) 60.

The threaded shaft 500 may comprise a screw portion 520 supported by a screw hole 220 provided through the threaded base 200.

The threaded shaft 500 may further comprise a handle portion 540 disposed at the end of the screw portion 520 farthest from the second movable jaw 400.

Each of the first and second movable jaw bodies 300, 400 may comprise an outer portion and an inner portion. The outer portion extends below the flat bottom portion 40, and the inner portion is disposed slide-ably within the inner channel portion 32 of the channeled straight edge bar 100.

The threaded shaft 500 may be disposed partially inside, entirely inside, or entirely outside the straight edge bar as shown in FIG. 3. The screw hole 220 may be disposed accordingly.

Figure 4:
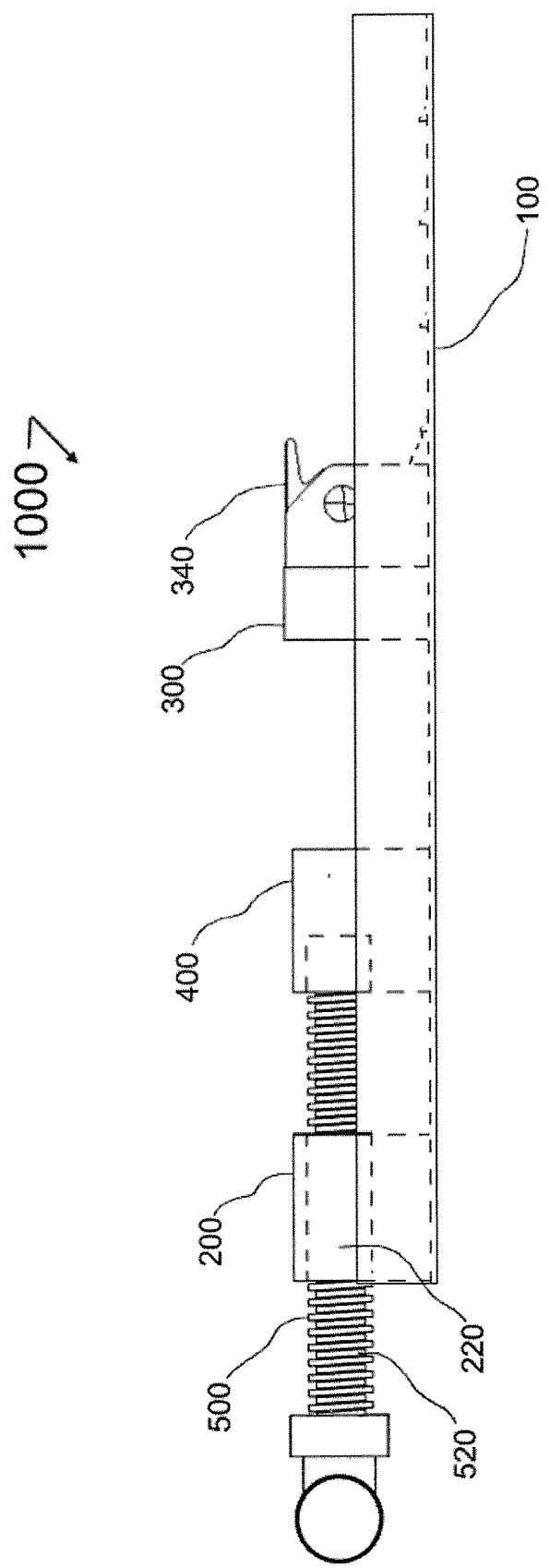
FIG. 4 is a side view showing a straight edge bar clamp according to the invention.

Referring to FIG. 4, the screw portion 520 of the thread shaft 500 is disposed such that a part thereof is positioned above the flat bottom portion 40. The threaded structure of the hole 220 and the rotate-able structure of the threaded shaft 500 is well known to the public.

Figure 5:
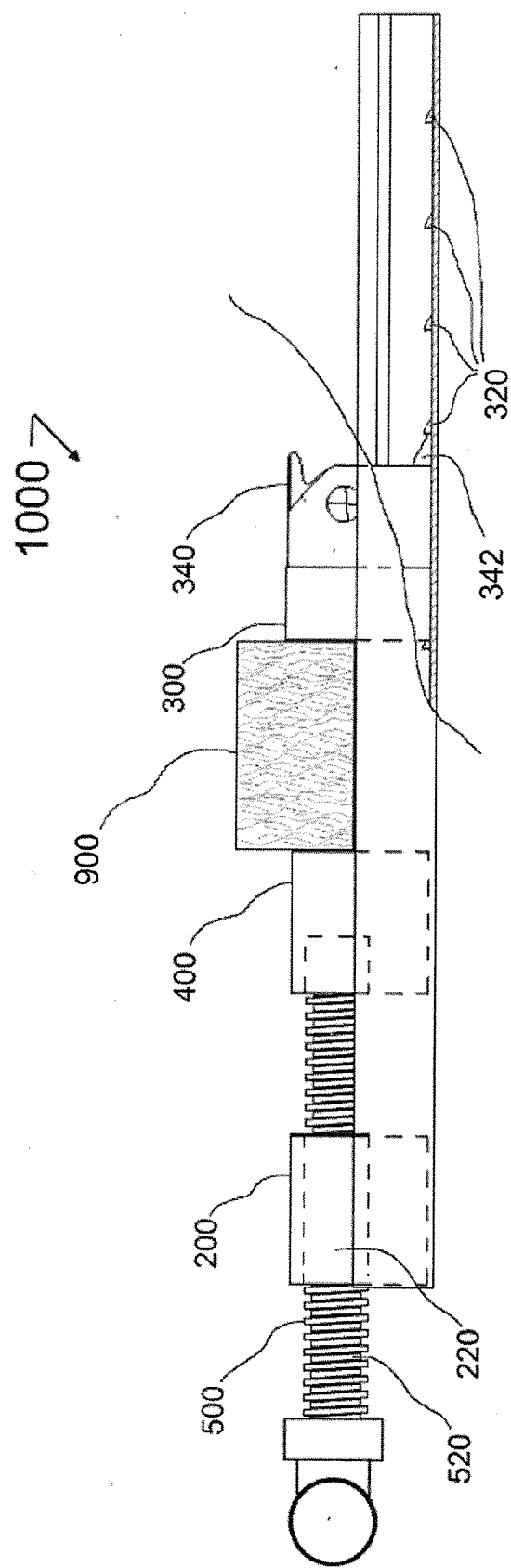
FIG. 5 is another side view showing a straight edge bar clamp used as a bar clamp according to the invention.

Referring to FIG. 5, the straight edge bar clamp 1000 is engaged on a work piece 900.

Figure 6:
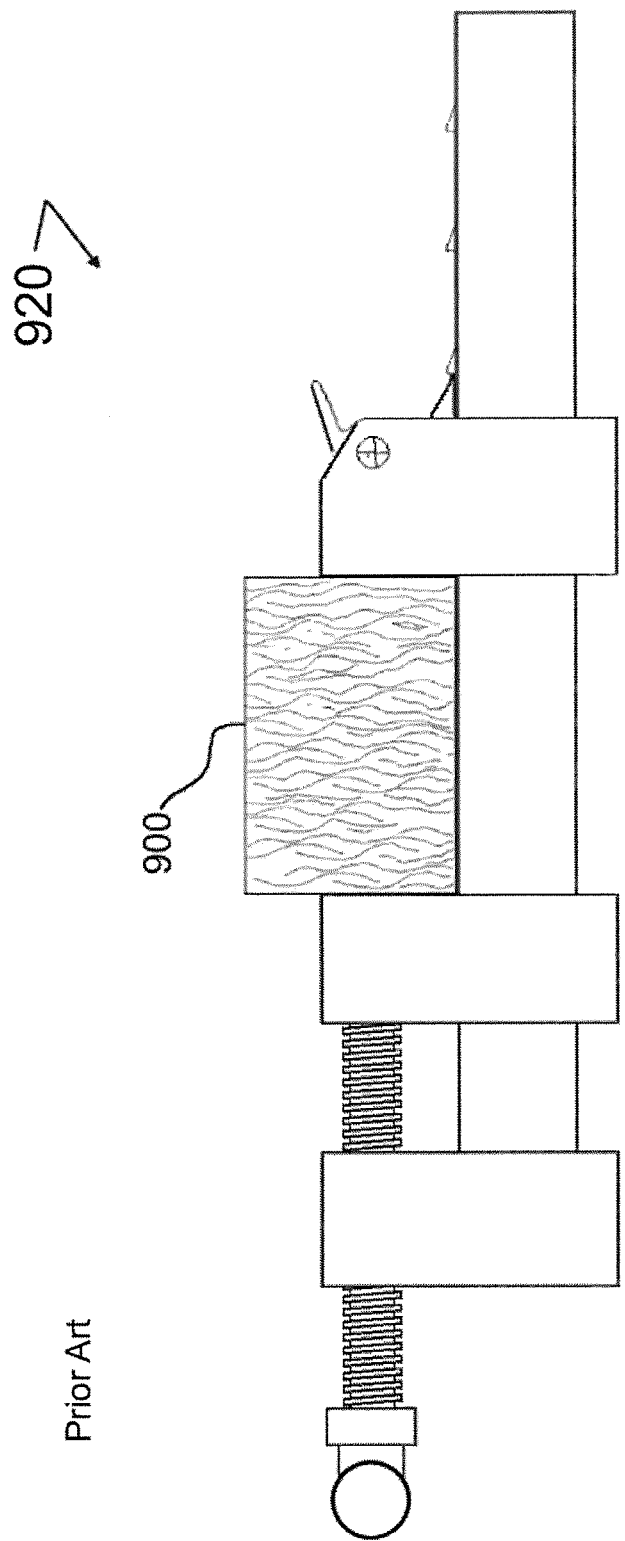
FIG. 6 is a conventional bar clamp in a prior art.

This can be compared to FIG. 6 showing a conventional bar clamp 920.

In the present invention, the threaded base 200, and the jaw bodies 300, 400 are all disposed in the channel 32, not around the straight edge bar 100 as is the prior art shown in FIG. 6. This makes a huge improvement in structure and functionality.

The channel 32 in the elongated channeled bar 100 is adapted to capture the clamp jaw bodies 300, 400 and threaded base 200. Also, the open channel 32 has side channel(s) 50 which capture, the jaw bodies 300, 400 the threaded base 200 and the threaded shaft 500 there in, in the channel 32 so they are moveable along the length but captured so they cannot lift out.

The clamping mechanism 1000, comprising the combination of the threaded base 200, the jaw bodies 300, 400, and the threaded rod 520, at the threaded edge bar 100 is configured such that the threaded rod 520 is supported by being screwed through the threaded base 200 and anchored rotate-ably at the second movable jaw body 400, while the threaded base 200, and the jaw bodies 300, 400 are disposed partially inside the channel 32 of the straight edge bar 100.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A straight edge bar clamp comprising:
a straight edge bar comprising an elongated channeled bar having an inner channel portion with a constant cross-section, wherein the straight edge bar comprises a first end and a second end;
a threaded base installed fixedly partially in the channel of the elongated channeled bar at the first end of the straight edge bar;
a first movable jaw body installed movably and partially in the channel of the elongated channeled bar at a plurality of predetermined positions along the straight edge bar;
a plurality of bosses or divots provided on an inner surface of the inner channel portion and configured to define the plurality of predetermined stopping positions for the first movable jaw;
a catching device provided in the first movable jaw body and configured to be engaged by or released from one or more of the plurality of the bosses or divots;
a second movable jaw body installed partially in the channel of the elongated channeled bar movably between the threaded base and the first movable jaw body along the elongated channeled bar; and
a threaded shaft disposed in parallel with the straight edge bar and configured to be supported through the threaded base and anchored rotate-ably at the second movable jaw body so as to move the second movable jaw body parallel to and along the straight edge bar, so as to exert a clamping force when engaged with a work piece between the moveable jaws,
wherein the catching device comprises a pawl, which is configured to be stopped at a catching position so as to be stopped by one or more of the bosses or divots or to be lifted up by a lifted distance larger than a predetermined magnitude so as to clear the bosses or divots and allow the first movable jaw body to slide along the straight edge bar.

2. The straight edge bar clamp of claim 1, wherein the straight edge bar further comprises:
a flat top portion;
straight edge portions;
a flat bottom portion;
capturing channel(s) provided between the flat top portion and the flat bottom portion and configured inside the inner channeled portion of the straight edge bar to capture and prevent the threaded base, the first movable jaw body, and the second movable jaw body from being lifted out of the inner channeled portion; and
overhanging portion(s), each of which being provided at an inner edge of the flat bottom portion and defining a wall of the corresponding capturing channel.

3. The straight edge bar clamp of claim 1, wherein each boss protrudes from the inner surface of the inner channel portion sufficiently to catch the pawl of the catching devise, or each divot may be a hollow spot on the inner channel portion of sufficient depth to catch the pawl of the catching devise.

4. The straight edge bar clamp of claim 1, wherein the threaded base comprises an outer portion and an inner portion, wherein the outer portion extends below the flat bottom portion, and wherein the inner portion is disposed and fixed in the channeled portion of the channeled bar, surrounded by the flat top portion, the capturing channel(s), and the overhanging portion(s).

5. The straight edge bar clamp of claim 1, wherein the threaded shaft comprises a screw portion supported by a matching threaded screw hole provided through the threaded base.

6. The straight edge bar clamp of claim 5, wherein the threaded shaft further comprises a handle portion disposed at an end of the screw portion, which is farthest from the second jaw body.

7. The straight edge bar clamp of claim 1, wherein each of the first and second movable jaw bodies comprises an outer portion and an inner portion, wherein the outer portion extends below the flat bottom portion, and wherein the inner portion is disposed slide-ably in the channeled portion of the channeled bar, surrounded by the flat top portion, the capturing channel(s), and the overhanging portion(s).

8. The straight edge bar clamp of claim 1, wherein the threaded shaft is disposed partially inside, entirely inside, or entirely outside the straight edge bar.

9. A straight edge bar clamp comprising:
a straight edge bar comprising an elongated channeled bar having an inner channel portion with a constant cross-section, wherein the straight edge bar comprises a first end and a second end;
a threaded base installed fixedly partially in the channel of the elongated channeled bar at the first end of the straight edge bar;
a first movable jaw body installed movably and partially in the channel of the elongated channeled bar at a plurality of predetermined positions along the straight edge bar;
a plurality of bosses or divots provided on an inner surface of the inner channel portion and configured to define the plurality of predetermined stopping positions for the first movable jaw;
a catching device provided in the first movable jaw body and configured to be engaged by or released from one or more of the plurality of the bosses or divots;
a second movable jaw body installed partially in the channel of the elongated channeled bar movably between the threaded base and the first movable jaw body along the elongated channeled bar; and
a threaded shaft disposed in parallel with the straight edge bar and configured to be supported through the threaded base and anchored rotate-ably at the second movable jaw body so as to move the second movable jaw body parallel to and along the straight edge bar, so as to exert a clamping force when engaged with a work piece between the moveable jaws,
wherein the straight edge bar further comprises:
a flat top portion;
straight edge portions;
a flat bottom portion;
capturing channel(s) provided between the flat top portion and the flat bottom portion and configured inside the inner channeled portion of the straight edge bar to capture and prevent each of the threaded base, the first movable jaw body, and the second movable jaw body from being lifted downwards out of the inner channeled portion; and
overhanging portion(s), each of which being provided at an inner edge of the flat bottom portion and defining a wall of the corresponding capturing channel, so as to capture and prevent each of the threaded base, the first movable jaw body, and the second movable jaw body from being lifted downwards out of the inner channeled portion.

10. The straight edge bar clamp of claim 9, wherein the catching device comprises a pawl, which is configured to be stopped at a catching position so as to be stopped by one or more of the bosses or divots or to be lifted up by a lifted distance larger than a predetermined magnitude so as to clear the bosses or divots and allow the first movable jaw body to slide along the straight edge bar.

11. The straight edge bar clamp of claim 10, wherein each boss protrudes from the inner surface of the inner channel portion sufficiently to catch the pawl of the catching devise, or each divot may be a hollow spot on the inner channel portion of sufficient depth to catch the pawl of the catching devise.

12. The straight edge bar clamp of claim 9, wherein the threaded base comprises an outer portion and an inner portion, wherein the outer portion extends below the flat bottom portion, and wherein the inner portion is disposed and fixed in the channeled portion of the channeled bar, surrounded by the flat top portion, the capturing channel(s), and the overhanging portion(s).

13. The straight edge bar clamp of claim 9, wherein the threaded shaft comprises a screw portion supported by a matching threaded screw hole provided through the threaded base.

14. The straight edge bar clamp of claim 13, wherein the threaded shaft further comprises a handle portion disposed at an end of the screw portion, which is farthest from the second jaw body.

15. The straight edge bar clamp of claim 9, wherein each of the first and second movable jaw bodies comprises an outer portion and an inner portion, wherein the outer portion extends below the flat bottom portion, and wherein the inner portion is disposed slide-ably in the channeled portion of the channeled bar, surrounded by the flat top portion, the capturing channel(s), and the overhanging portion(s).

16. The straight edge bar clamp of claim 9, wherein the threaded shaft is disposed partially inside, entirely inside, or entirely outside the straight edge bar.

* * * * *